United States Patent [19]

Bilotta et al.

[11] Patent Number: 5,743,330
[45] Date of Patent: Apr. 28, 1998

[54] RADIANT HEAT TRANSFER PANELS

[75] Inventors: Frank Bilotta, Port Jefferson Station; Todd Shaw, Sound Beach, both of N.Y.

[73] Assignee: Radiant Technology, Inc., Bellport, N.Y.

[21] Appl. No.: 711,019

[22] Filed: Sep. 9, 1996

[51] Int. Cl.⁶ ............................................. F28F 1/20
[52] U.S. Cl. .................. 165/183; 165/171; 165/DIG. 524
[58] Field of Search ............................ 165/171, 183; 72/379.2

[56] References Cited

U.S. PATENT DOCUMENTS

| | | |
|---|---|---|
| 2,823,016 | 2/1958 | Greer, Jr. . |
| 3,037,746 | 6/1962 | Williams . |
| 4,064,866 | 12/1977 | Knight, Jr. ...................... 165/171 X |
| 4,079,781 | 3/1978 | Wesseltoft ...................... 165/76 |
| 4,182,013 | 1/1980 | Grossman ...................... 165/171 X |
| 4,338,994 | 7/1982 | Hewing et al. . |
| 4,338,995 | 7/1982 | Shelley . |
| 4,635,710 | 1/1987 | Shelley . |
| 4,766,951 | 8/1988 | Bergh . |
| 4,782,889 | 11/1988 | Bourne . |
| 5,042,569 | 8/1991 | Siegmund . |
| 5,078,203 | 1/1992 | Shiroki . |
| 5,454,428 | 10/1995 | Pickard et al. . |

FOREIGN PATENT DOCUMENTS

| | | | |
|---|---|---|---|
| 2183022 | 5/1987 | United Kingdom | ............... 165/171 |
| 2197810 | 6/1988 | United Kingdom | ............... 72/379.2 |

Primary Examiner—Allen J. Flanigan
Attorney, Agent, or Firm—Dilworth & Barrese

[57] ABSTRACT

Panels for supporting heat transfer tubing are provided with a tubing-receiving track having a multi-faceted inner surface that enhances reception of the tubing, installation of the panels and ultimately heat transfer effectiveness.

26 Claims, 4 Drawing Sheets

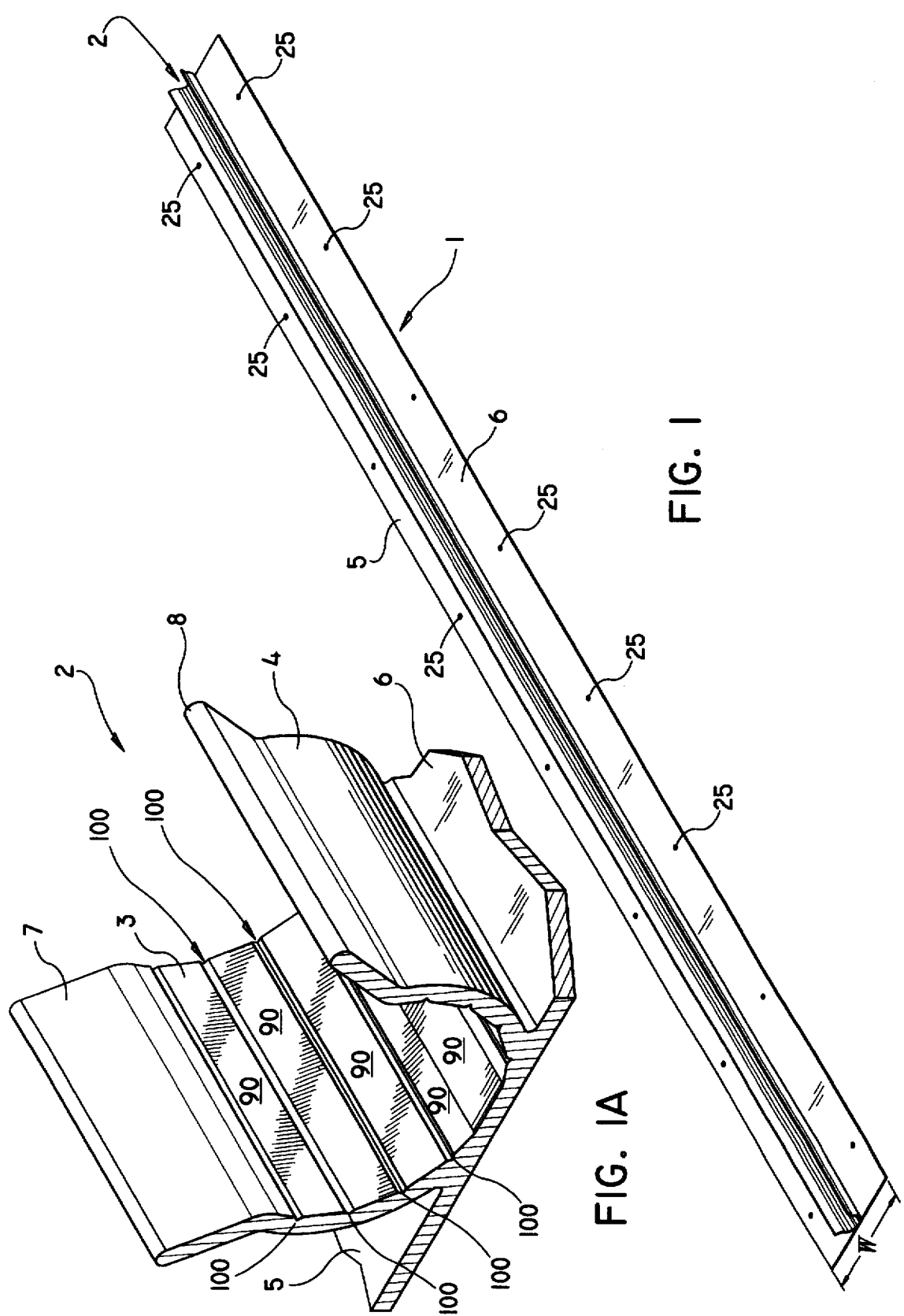

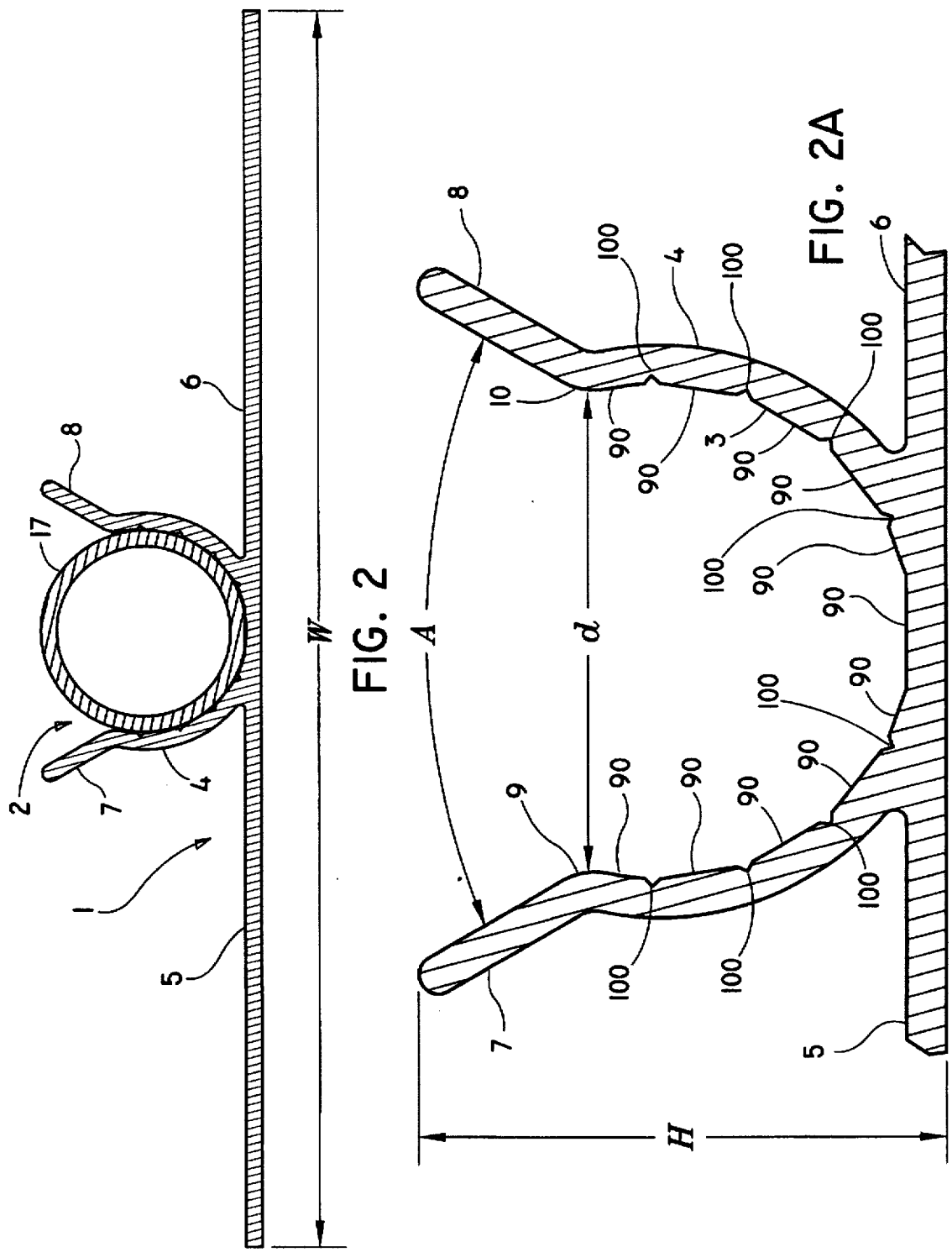

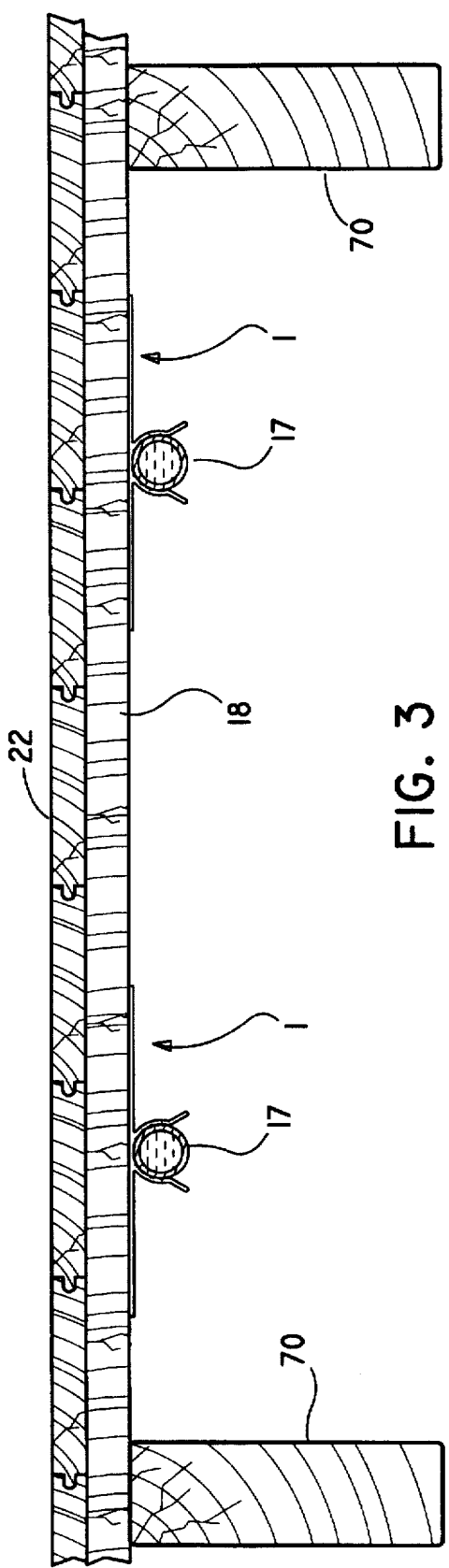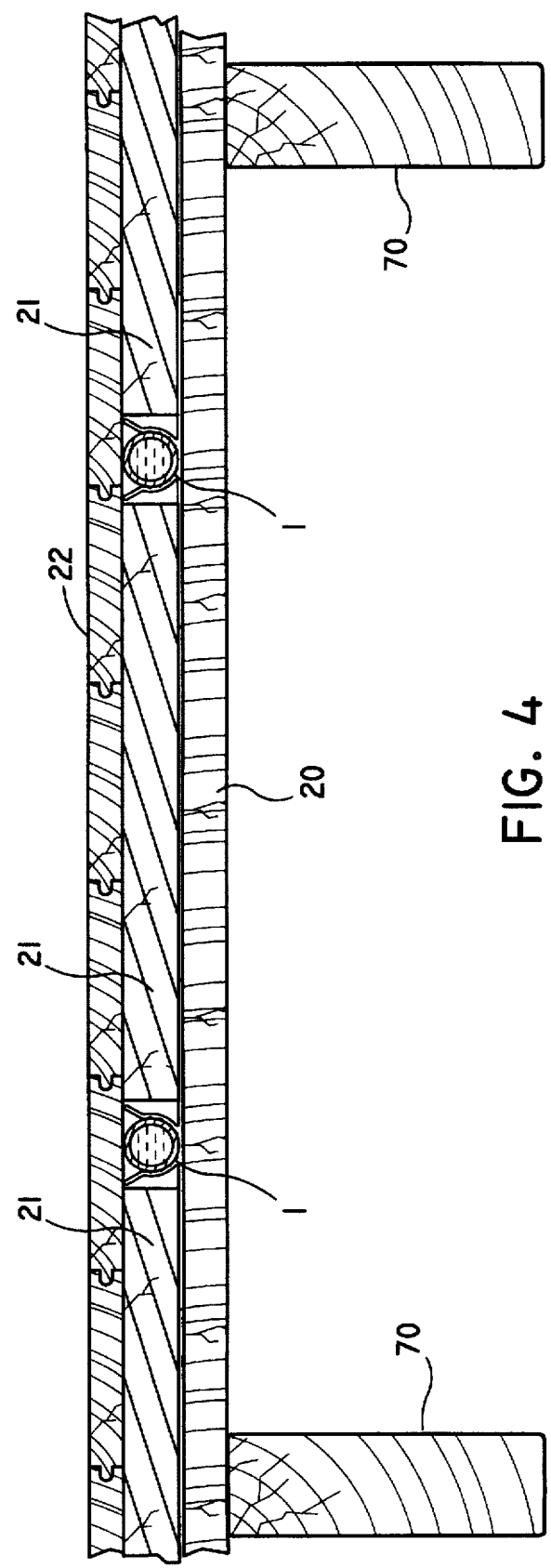

RADIANT HEAT TRANSFER PANELS

The present invention is directed to a heat transfer panel for supporting tubing carrying heat transfer fluid. More particularly, the present invention is directed to a heat transfer panel capable of securely supporting heat transfer tubing that is fabricated from plastic and being easily installed into building structures from any available position. As used herein, the term "heat transfer" encompasses heat exchange for both heating and cooling purposes. For example, the heat transfer tubing can carry heating fluid such as water or cooling/refrigeration fluid such as Freon ($CCl_3F$).

Installation of panels for supporting heat transfer tubing into structures such as ceilings and sub-floors is well-known. For example, U.S. Pat. Nos. 5,078,203; 5,042,569; 4,782,889; 4,766,951; 4,635,710; 4,338,995; 3,037,746; and 2,823,016 all disclose installations for heat transfer tubing within structures. In particular, U.S. Pat. No. 5,454,428 to Pickard et al., the contents of which are incorporated by reference herein, discloses an extruded aluminum radiant heat transfer plate having a receptacle for plastic heat transfer tubing and thin-walled fins extending outwardly therefrom. The tubing-receiving channel of the receptacle is curved and smooth, i.e., semicircular in configuration, having a diameter nominally the same as the plastic tubing inserted thereinto (column 1, lines 65–66; column 2, lines 6–7 and 33–36). Additionally, a pair of outwardly-extending guideway sides define a receptacle guideway opening into the tubing receiving space, such that tubing must be forced past the guideway sides and deformed to pass into the tube receiving space (column 2, lines 12–15 and 43–47).

According to U.S. Pat. No. 5,454,428, when warm water passes through the plastic tubing, the tubing expands slightly and tightens in its bearing against the smooth side of the receptacle channel; it is required that the channel wall be sufficiently thick to avoid warping due to tubing expansion and/or flow of warm water (column 2, lines 16–24). A typical gap of 0.010 inches or less between the receptacle channel and the exterior of the plastic tubing disappears upon expansion of the tubing (column 5, lines 31–37). According to this patent, previously-used silicone caulking to fill spaces between the tubing and supporting heat transfer plate to eliminate connective heat transfer is not required, although a small amount of sealant can be introduced (column 5, lines 22–31 and 37–44). The principal mode of heat transfer between tubing and channel is conductance, not convection (column 5, lines 43–46).

However, the heating panel arrangement, U.S. Pat. No. 5,454,428 still suffers for several disadvantages. For example, warm or hot heat transfer fluid must flow through and expand the tubing so the tubing can be securely retained by the receptacle therefor. In this regard, a minor amount of sealant is still required to retain the tubing in place, as noted above. Furthermore, passage of coolant or refrigerant through the plastic tubing would cause the same to contract and therefore might loosen retention by the receptacle.

It has now been found that it is surprisingly possible to improve retention of heat transfer tubing by a receiving heating/cooling panel while, at the same time improving both convective and conductive heat transfer between the tubing and receiving panel and enhancing installation of the panels in building structures.

SUMMARY OF THE INVENTION

Accordingly, it is an object of the invention to improve heat transfer such as heating or cooling.

It is also an object of the present invention to improve installation and effectiveness of heat transfer elements within a structure.

These and other objects are attained by the present invention which is directed to a radiant heat transfer panel comprising a track for receiving tubing carrying heat transfer fluid. The track has an inner surface that is multi-faceted. One or more fins can be mounted upon an outer surface of the track, these fins extending out in opposite directions from one another. Additionally, a pair of extensions can be mounted upon the track to flare outwardly away from the track, to thereby facilitate insertion of the heat transfer tubing into the track. In particular, distance between junctures of respective extensions and the track inner surface is narrower than an inner diameter of the track so that tubing can be snapped into place in the track by passing between these junctures and then securely retained in the track.

With the radiant heat transfer panel of the present invention, the heat transfer tubing can be securely retained in the receiving track without need for caulking or sealant such as silicone. The heat transfer tubing is securely retained by the heating panel, even when carrying cooling or refrigerating fluid such as Freon which would cause the plastic tubing to contract. The heat transfer tubing is securely gripped by, among other features, the segmented faces of the multi-faceted, inner surface of the receiving track. This discontinuous, segmented, inner surface of the receiving track improves gripping of the tubing over a smooth surface as shown, e.g., in U.S. Pat. No. 5,454,428, minimizing the danger of the tubing popping out or disengaging from the track after installation. Furthermore, heat transfer between the tubing, panels, optionally fins extending therefrom, and ultimately with the surroundings is improved because heat transfer surface area of the track increased as opposed to the smooth structure shown, e.g., in U.S. Pat. No. 5,454,428. This is a surprising improvement because unlike the structure shown in U.S. Pat. No. 5,454,428, heat transfer efficiency is maximized by both conductance and convection. Thus improved heating/cooling efficiency is attained with the inventive radiant heat transfer panels, together with concomitant improvement in energy conservation.

BRIEF DESCRIPTION OF THE DRAWINGS

The present invention will be described in greater detail with reference to the accompanying drawings, in which FIG. 1 is a perspective view of one embodiment of the radiant heat transfer panel in accordance with the present invention;

FIG. 1A is a fragmentary sectional view of the heating panel of FIG. 1;

FIG. 2 is a sectional view of the heating panel of FIGS. 1 and 1A illustrating reception of heat transfer tubing therein;

FIG. 2A is an enlarged fragmentary view of the panel of FIG. 2 before insertion of the tubing thereinto;

FIG. 3 is an elevational view illustrating mounting of the panel of FIG. 1 below the subfloor in a building installation;

FIG. 4 is a view similar to FIG. 3 and illustrating mounting of the panel above the subfloor;

DESCRIPTION OF THE PREFERRED EMBODIMENTS

Figure 5:
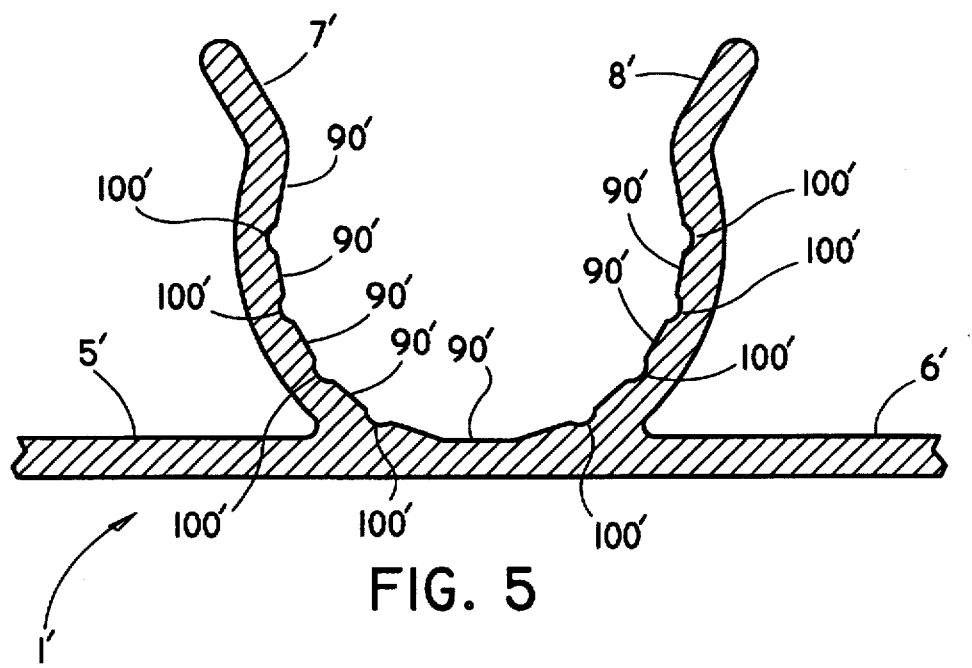
FIG. 5 is an enlarged fragmentary sectional view similar to FIG. 2A of another embodiment of the panel in accordance with the present invention.

Referring to the drawings, an elongated heat transfer panel 1 is illustrated, in perspective, in FIG. 1. The panel 1 comprises a track 2 for receiving heat transfer tubing 17, the track 2 having inner and outer surfaces 3 and 4. Two fins 5 and 6 are integrally formed upon the outer surface 4 of the panel track 3 and extend at an approximately 180° angle with respect to one another, i.e., extend oppositely away from one another, as illustrated. A pair of extensions 7, 8 are also integrally mounted upon the track and flare outwardly away from the track 2, which facilitates insertion of the heat transfer tubing 17 as described further below. In particular, the distance d (FIG. 2a) between junctures 9, 10 of respective extensions 7, 8 and the track 2 is narrower than an inner diameter of the track 2. This serves to securely retain the tubing 17 within the track 2 once inserted thereto (FIG. 2), the extensions 7, 8 flare away from one another at an angle A of preferably about 60° to 80°, most preferably about 65°–70°.

Figure 6:
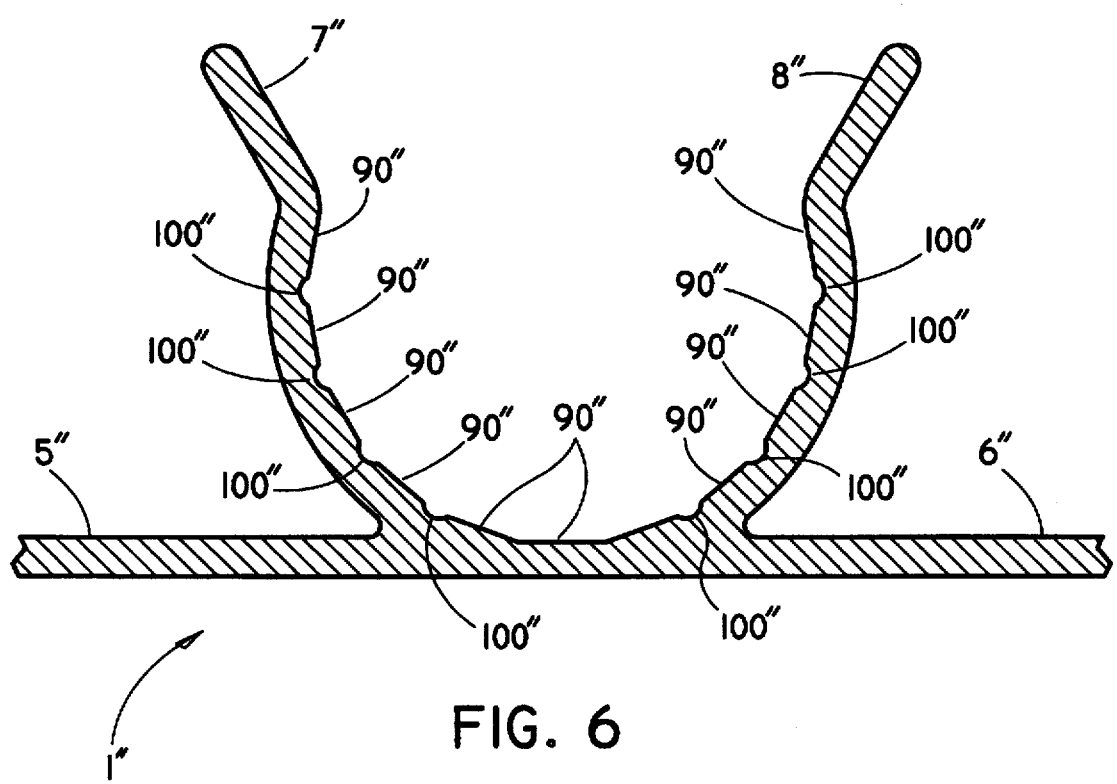
FIG. 6 is an enlarged fragmentary sectional view similar to FIG. 5 of a further embodiment of the panel in accordance with the present invention.

In accordance with the present invention, the inner surface 3 of the tubing-receiving track 2 is multi-faceted, e.g., composed of a series of discontinuous, discrete, substantially straight faces 90 that are angled with respect to one another (FIGS. 1A and 2A). Notches 100 can be provided along the inner surface 3 the track 2 between adjacent faces 90 and illustrated in FIG. 2A; alternatively, curved indentations 100', 100" can be provided between adjacent faces 90', 90" as illustrated in FIGS. 5 and 6 (analogous components in FIGS. 5 and 6 are denoted by ' and " symbols respectively). The discrete faces 90, 90' and 90" of track surface 3, 3', 3" can form respective chords of an arc greater than about 180°, preferably about 200°–250°, and most preferably about 220°–230°, so that the tubing 17 is secured confined by the track 2 when inserted thereinto. As shown, e.g., in FIGS. 1A, 2A, 5 and 6, eleven discrete faces 90, 90', 90" are provided along the multi-faceted, inner surface of the tubing-receiving track; however, any convenient number of discrete, angled faces can be provided within the context of the present invention. Preferably, the tubing-receiving track 2 is symmetrical, as best seen in FIGS. 2, 2a, 5 and 6.

The outer surface 4 of the tubing-receiving track 2 can be substantially smooth as illustrated, as long as the inner surface 3 is multi-faceted. In this regard, indentations or notches can be omitted between the three lowermost faces of the multi-faceted inner surface 3, as best seen in FIGS. 2A, 5 and 6. In the illustrated embodiments, each face subtends an arc or central angle of approximately 20°. Radii of the subtended angles are measured from the approximate center of the adjacent notches or indentations 100 where present. Thus the eleven faces 90 constitute chords of an arc of approximately 220°; however any number of discrete faces 90 can be provided in accordance with the present invention so that the total degrees of the arc subtended by all the chords or faces 90 can vary. The embodiments shown in FIGS. 2a and 5 are formed to provide a track 2 having an approximately inner diameter of ½ inch; such a track can flexibly accommodate plastic heat transfer tubing 17 having an outer diameter of approximately ½ inch. The embodiment shown in FIG. 6 is formed to provide a tubing receiving track having an inner diameter of approximately ⅝ inch and which is designed to flexibly accommodate heat transfer tubing having an outer diameter of approximately ⅝ inches. In other respects, the construction of the embodiments shown in FIGS. 5 and 6 is identical. Provision of the notches or curved indentations 100', 100" and 100''' has been found to improve flexibility so that the heat transfer tubing 17 can be easily snapped into place as shown in FIG. 2, with the track 2 resiliently expanding outwardly to accommodate the tubing 17 and retain the same therein. In this regard, the heat transfer panel 1 can be constructed of a feasible material such as metal or metallic alloy, with aluminum being the preferred material due to heat transfer effectiveness. The heat transfer tubing can be constructed from either metal or metallic material such as copper, or from plastic such as polyethylene, polybutylene, polyvinyl alcohol and copolymers of any of the same. Especially preferred material is cross-linked polyethylene. Additionally, each of the extensions 7 and 8 is approximately 0.1 to 0.2 inches in length from the ends thereof to the respective junctures 9 and 10, while the fins 5 and 6 provide a total width W (FIGS. 1 and 2A) of approximately 3½ to about 4½ inches, most preferably about 4 inches. The heat transfer tubing 17 can be manufactured by extruding aluminum material through an appropriately cut die at a temperature of about 800°–900° F., preferably about 875° F. and pressure of about 3,000–3,500 psi, preferably about 3,200 psi, by conventional extruding processes well known in the field.

Installation of the heating panels 1 together with the heat transfer tubing 17 within various structures is illustrated in FIGS. 3 and 4. The first step involved is determining the "net" area to be heated. Any area that should not be heated such as cabinets and closets, should be deducted from total square footage. This provides an net or actual area that should be used to determine system heat output and material requirements. Next, the required water and flow surface temperature should be determined from the following Tables I and II by the following steps 1, 2 and 3a–3d.

TABLE I

Output Chart
(Based on 68 degree F. Room Temperature w/max. coverage)
Required Water Temperature (degrees F.) in boxes

| Required Floor Output (BTU/SQ. FT.) | | | | | | | | | | Floor Surface Temp. (°F.) |
|---|---|---|---|---|---|---|---|---|---|---|
| 45 | 112 | 135 | 157 | | | | | | | 90 |
| 40 | 108 | 129 | 148 | | | | | | | 87 |
| 35 | 104 | 122 | 139 | 156 | | | | | | 85 |
| 30 | 100 | 115 | 130 | 145 | 160 | | | | | 83 |
| 25 | 95 | 108 | 120 | 133 | 145 | 157 | | | | 81 |
| 20 | 90 | 100 | 110 | 120 | 130 | 140 | 148 | 159 | 168 | 78 |
| 15 | 85 | 93 | 100 | 108 | 115 | 123 | 128 | 137 | 144 | 153 | 76 |
| 10 | 80 | 85 | 90 | 95 | 100 | 105 | 108 | 114 | 119 | 125 | 73 |
| 5 | 75 | 77 | 80 | 83 | 85 | 87 | 89 | 91 | 94 | 98 | 70 |
| | .5 | 1.0 | 1.5 | 2.0 | 2.5 | 3.0 | 3.5 | 4.0 | 4.5 | 5.0 | |

R-Value of Flooring

1. Find the Required Floor Output (heat loss/net area) on the left side of the chart and read across to the right to determine the Floor Surface Temperature;
2. Calculate the total R-Value of the floor (use R-Value Table II below) and extend a line up from this R-Value to the point at which it intersects the first line and read the Required Water Temperature at the point of intersection;
3. If the Required Water Temperature is above 150 degrees F. or the Floor Surface Temperature is above 85 degrees F. (90 F. baths/foyers):
   a. Check the heat loss calculations for accuracy. Have they been determined for Radiant Heat?;
   b. Choose a flooring with a lower R-Value;
   c. Reduce the heat loss of the area (i.e., increased insulation, new windows, storm windows); and/or
   d. Include a supplemental heat source for area.

TABLE II

| FLOORING | R-VALUES |
|---|---|
| WOOD | |
| Luan ¼" | .29 |
| Plywood ½" | .62 |
| Plywood ¾" | .93 |
| Oak ¾" | .78 |
| Pine ¾" | 1.20 |
| TILE | |
| Stone/Marble ½" | .20 |
| Vinyl/Linoleum ⅛" | .21 |
| Ceramic ⅜" | .22 |
| CARPET | |
| Acrylic Level Loop ½" | 2.08 |
| Acrylic Push ½" | 1.72 |
| Nylon Level Loop ½" | 2.72 |
| Nylon Plush ½" | 1.04 |
| CARPET PAD | |
| Waffled Sponge Rubber ⅜" | .66 |
| Hair & Jute ⅜" | 1.47 |
| Urethane ⅜" | 1.65 |

Generally floor surface temperature should not exceed 85° F., especially when using hardwood flooring. Higher temperatures may dry out and cause gaps in the flooring. Floor surface temperature should not exceed 90° F. in bathrooms and foyers.

Next the appropriately sized heating panel 1, 1' or 1" should be selected, i.e., to accommodate either 0.50 or 0.625 inch O.D. (outer diameter) "PEX"-pipe (cross-linked polyethylene), with 8 inches center spacing. In other words as illustrated in FIG. 3, there is an approximately distance of 8 inches between center lines of adjacent heating panels 1. As illustrated in FIG. 3, two panels 1 per bay can be installed from below a subfloor 18 between 1.6 inch O.C. (on center) joists 70.

Then, the tubing required for 8 inches on center spacing is determined by multiplying the net area by 1.5, including supply and return runs to the boiler/manifold location. The total length of piping/tubing is then multiplied by 0.85 which takes into account turns at the end of each run not supported by the panels 1. Dividing this number by 4 (in the case of 4 ft. length panels) provides the estimated number of panels required per area. The maximum circuit length for a loop is 300 feet for 0.50 in O.D. PEX pipe and 400 feet for 0.625 inch O.D. PEX-pipe, while the maximum area that can be covered per loop utilizing 8 inch center spacing of panels 1 as illustrated in FIGS. 3 and 4 is 200 square feet for 0.50 inch O.D. tubing and 265 square feet for 0.625 inch O.D. tubing. Taking into account the supply and return runs to the boiler/manifold location, the number of loops can now be determined. If the boiler location is a great distance from the area to be heated, then a remote manifold location should be established.

Once the number of heat transfer panels has been determined, then installation thereof can proceed. Using the pre-punched mounting holes 25, the heating panels 1 are individually installed upon the sub-floor 18 or 20 in. FIGS. 3 and 4 respectively, by hammering appropriate fasteners such as nails into place. A small gap between the ends of adjacent panels 1 in the lengthwise direction should be provided to allow for any expansion/contraction of the aluminum based panels 1. Once the panels have been appropriately secured, then the tubing 17 can be installed within the respective track 2 of the panel 1. A bead of silicone caulking can be run into the track 2 to improve heat transfer and prevent thermal expansion of the tubing (unlike U.S. Pat. No. 5,454,428, retention of the tubing 17 within the panel tracks 2 herein does not depend upon expansion of the tubing due to heating fluid). Furthermore, provision of silicone caulking is not required to retain the tubing 17 within the panel 1 track 2, because of improved flexibility provided by the multi-faceting of the inner track surface 3.

The tubing 17 is simply snapped into place, optionally with the aid of a rubber mallet. No additional fasteners or support are required as the radiant heating panels securely and reliably retain the heat transfer tubing in place. In the case of above-floor applications as illustrated in FIG. 4, approximately 7 inches wide filler boards or sleepers 21 made, e.g., of plywood, are provided between adjacent panels 1. After the tubing 17 is snapped into place, a finished wood flooring 22 can be installed directly over the panels 1 and secured to the sleepers filler boards 21. If carpet or tile flooring constitutes the finished floor 22, then an additional ¼ inch luan should preferably be installed on the sleepers 21 to provide a sound continuous subfloor.

Suitable foil-faced insulation with foil side facing up can be installed between joints 70. The heating panels 1 are preferably manufactured from aluminum and are cut into lengths of approximately 48 inches with 4 inch width as illustrated. When designed to receive 0.50 inch O.D. PEX tubing 17, the overall height H (FIG. 2A) of the panel 1 is about 0.550" with an internal diameter of about 0.515 inch, wall thickness about 0.050 inch and weight per panel of 1.20 lbs. In the case of the design to receive 0.625 inch O.D. PEX tubing 17, then overall height H is now about 0.675 inch, with an internal channel diameter of approximately 0.640 inch, wall thickness about 0.50 inch and weight per panel of 1.28 lbs. While the embodiments of the present invention have been illustrated with one track 2 per panel 1, it is entirely conceivable within the purview of the present invention to provide two or more tracks 2 upon the same heat transfer panel 1. Additionally, the direction of the tracks can be curved arced, if desired, to accommodate turns of the tubing 17 should arrangement thereof be warranted in installation.

Other advantages provided by the heat transfer panels include fast, effective installation of radiant heat in virtually every application (floors, walls and ceilings). The firm yet flexible, multi-faceted channel construction enables flexible tubing such as PEX piping to be easily "snapped" into place, tight and secure. Expensive or impractical light-weight concrete pours and time consuming reflecting tray installations can be eliminated. The heating panels are outstanding for both new construction and retrofit. Coupled with the excellent thermal conductivity of aluminum, 120 times that of concrete, the heating panels constitute the ideal material choice and structure for radiant heating system.

Increased heat output and more uniform floor temperatures, at lower water temperatures, are provided than potentially damaging "staple-up" installations. The panels are easily installed from below the subfloor as illustrated, with no alteration to existing or planned wood frame floor construction required. The panels are also adapted for above floor, wall and ceiling applications and are self-supporting, with no need for additional straps or fasteners to secure the tubing. Furthermore, the multi-faceted, open channel design leaves pipe runs fully visible and accessible during installation. The panels are provided in convenient 4 foot lengths to simplify ordering and installation (if necessary, the panel can be easily cut to length on the job). "Dry" system installation greatly increases the response time to room temperature changes, unlike "wet" (concrete) installations which are associated with slow response due to the large mass of the floor.

The preceding description of the present invention is merely exemplary and is not intended to limit the scope thereof in any way.

We claim:

1. A radiant heating panel comprising a track for receiving tubing carrying heat transfer fluid, said track comprising an inner surface that is multi-faceted, and a pair of extensions mounted upon said track and arranged to flare outwardly away from said track and thereby facilitate insertion of the heat transfer tubing into said track.

2. A radiant heating panel comprising a track for receiving tubing carrying heat transfer fluid, said track comprising an inner surface that is multi-faceted, two fins mounted upon an outer surface of said track and extending in substantially opposite directions from one another, and a pair of extensions mounted upon said track and arranged to flare outwardly away from said track and thereby facilitate insertion of the heat transfer tubing into said track.

3. The panel of claim 1, wherein distance between junctures of respective extensions and said track inner surface is narrower than an inner diameter of said track.

4. The panel of claim 2, wherein distance between junctures of respective extensions and said track inner surface is narrower than an inner diameter of said track.

5. The panel of claim 4 additionally comprising notches or curved indentations between several faces defined by said multi-faceted inner surface.

6. The panel of claim 4, additionally comprising curved indentations between several faces defined by said multi-faceted inner surface.

7. The panel of claim 5, additionally comprising notches between several faces defined by said multi-faceted inner surface.

8. The panel of claim 4, comprising eleven discrete faces of said multi-faceted inner surface.

9. The panel of claim 2, wherein said outer surface of said track is substantially smooth.

10. The panel of claim 2, wherein faces of said multi-faceted inner track form chords of an arc greater than about 180° so that the tubing is securely confined when inserted therein.

11. The panel of claim 10, wherein said arc is approximately 200°–250°.

12. The panel of claim 1, wherein faces of said multi-faceted inner track form chords of an arc greater than about 180°.

13. The panel of claim 12, wherein said arc is approximately 200°–250°.

14. The panel of claim 11, wherein said extensions flare at an angle of from about 60° to about 80° with respect to one another.

15. The panel of claim 11, wherein said multi-faced track is substantially symmetrical.

16. The panel of claim 13, wherein said multi-faceted track is substantially symmetrical.

17. The combination of heat transfer tubing manufactured from plastic and the panel of claim 2.

18. The panel of claim 1, wherein said multi-faceted inner surface is composed of a series of discontinuous, discrete, substantially straight faces that are angled with respect to one another.

19. The panel of claim 2, wherein said multi-faceted inner surface is composed of a series of discontinuous, discrete, substantially straight faces that are angled with respect to one another.

20. The panel of claim 18, being structured and arranged to securely retain the tubing therein without expansion of the tubing and improve both convective and conductive heat transfer between the tubing and said panel.

21. The panel of claim 19, being structured and arranged to securely retain the tubing therein without expansion of the tubing and improve both convective and conductive heat transfer between the tubing and said panel.

22. The panel of claim 20, additionally comprising notches or curved indentations between several of said faces defined by said multi-faceted inner surface, such that adjacent rims of each said notch or curved indentation do not abut when the tubing is received in said track.

23. The panel of claim 21, additionally comprising notches or curved indentations between several of said faces defined by said multi-faceted inner surface, such that adjacent rims of each said notch or curved indentation do not abut when the tubing is received in said track.

24. A radiant heating panel comprising a track for receiving tubing carrying heat transfer fluid, said track comprising an inner surface that is multi-faceted, notches between several faces defined by said multi-faceted inner surface, and an absence of notches between three lowermost faces of said multi-faceted track.

25. A radiant heat panel comprising a track for receiving tubing carrying heat transfer fluid, said track comprising an inner surface that is multi-faceted, curved indentations between several faces defined by said multi-faceted inner surface, and an absence of indentations between three lowermost faces of said multi-faceted track.

26. The combination of heat transfer tubing manufactured from plastic and the panel of claim 1.

* * * * *